United States Patent Office 3,380,962
Patented Apr. 30, 1968

3,380,962
STABILIZATION OF POLYOLEFINS WITH DERIVATIVES OF 3-LOWER ALKYL-4-HYDROXYPHENOXYALKANOIC ACIDS
Janet B. Peterson, Yonkers, and Martin Dexter, Briarcliff Manor, N.Y., assignors to Geigy Chemical Corporation, Greenburgh, N.Y., a corporation of Delaware
No Drawing. Original application Sept. 17, 1962, Ser. No. 244,601, now Patent No. 3,249,632, dated May 3, 1966. Divided and this application Oct. 22, 1965, Ser. No. 510,730
15 Claims. (Cl. 260—45.85)

ABSTRACT OF THE DISCLOSURE

Polymeric material, especially polyolefins such as polypropylene are stabilized against oxidative deterioration with a stabilizer which is an ester or substituted amide of certain substituted hydroxyphenoxyalkanoic acids. A preferred stabilizer is the compound β,β'-thiodiethanol bis(3,5-di-tert.butyl-4-hydroxyphenoxyacetate).

Cross reference to related application

This application is a divisional application of our copending application Ser. No. 224,601, filed Sept. 17, 1962 and now U.S. Patent No. 3,249,632.

This invention relates to the stabilization of polypropylene and other unstable organic material with derivatives of certain alkanoic acids, in particular with esters and substituted amides of certain substituted phenoxyacetic acids. The invention also relates to a method of preparing stabilized polypropylene and/or other organic material subject to degradation.

More specifically, the invention pertains to stabilization of polypropylene and/or other organic material normally subject to oxidative, or other deterioration with a stabilizer of the Formula I:

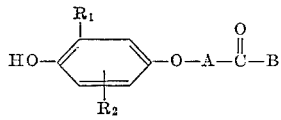

wherein

A is a lower alkylene group (straight or branched chain), especially lower alkylene having 1 to 6 carbon atoms such as —CH$_2$—, —CH$_2$—CH$_2$—, —CH—, —CH$_2$—CH—CH$_2$—CH$_2$—CH$_2$—CH$_2$—
  |           |
  CH$_3$        CH$_3$ etc.; preferably —CH$_2$—, R$_1$ is an alkyl group, especially of 3 to 8 carbon atoms, preferably a secondary or tertiary alkyl group, e.g. t-butyl, sec. octyl, R$_2$ represents hydrogen or at least one alkyl group— especially, of from 1 to 8 carbon atoms, preferably a secondary or tertiary alkyl adjacent to OH—but in the case of a tertiary alkyl group it is understood that bulky groups as the tertiary butyl group are not contemplated in positions adjacent to one another in the phenyl nucleus;

B represents alkylimino, alkoxy, alkylthioalkoxy, the group

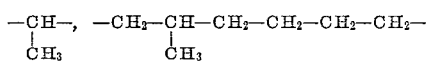

wherein

A is the same as above,
n is 0 or 1,
R$_1$ and R$_2$ are the same as above,
X and Y are each independently lower alkylene, preferably ethylene.

In the foregoing Formula I,

R$_1$ may be methyl, ethyl, propyl, butyl, pentyl, hexyl, heptyl, octyl,
R$_2$ may be methyl, ethyl, propyl, butyl, pentyl, hexyl, heptyl, octyl,
B may be alkylimino of 1 to 24 carbon atoms, or alkoxy of 1 to 24 carbon atoms, examples of alkyl groups in alkylimino and alkoxy being the same as R$_2$ and also nonyl, decyl, undecyl, dodecyl, tetradecyl, octadecyl, nonadecyl, eicosyl, docosyl, tricosyl, tetracosyl; alkylthioalkoxy of 2 to 24 carbon atoms, e.g. methylthiomethoxy, methylthioethoxy, methylthiopropoxy, dodecylthioethoxy, octylthioethoxy, octadecylthiobutoxy, docosylthioethoxy, etc.

It is an object of the invention to provide stable organic material, e.g., stable polyolefinic material, preferably stable polypropylene and polyethylene. Preferably the polyolefins are of high molecular weight, e.g., above 1000 into the hundreds of thousands range. The polyethylenes may be of high density, medium density or low density class.

Polymeric materials such as the foregoing find use as thermoplastic molding or coating agents. Moreover, because of their high dielectric strength and their resistance to water, they are particularly useful as insulators or dielectrics in condensers and other such equipment. It is known that these polyolefins, e.g. polyethylene and polypropylene, are attacked by oxygen, particularly when exposed to the atmosphere and at elevated temperatures. For example, during use or manufacture the desirable properties of the polyolefins may be impaired due to oxidative deterioration. Such degradation causes loss in dielectric properties, discoloration, embrittlement gelation, etc. Thermal degradation is also checked by the invention.

Not only homopolymeric material, but also copolymers and physical mixtures thereof are stabilized according to the present invention. For example, high impact polystyrene containing copolymers of butadiene and styrene are stabilized according to the invention.

The invention is also useful in stabilizing lubricating oils of various types including aliphatic esters such as, e.g. dihexyl azelate, di-(2-ethylhexyl)azelate, di-(3,5,5-trimethylhexyl)glutarate, di - (3,5,5 - trimethylpentyl)glutarate, di-(2-ethylhexyl)pimelate, di-(2-ethylhexyl)adipate, diisoamyl adipate, triamyl tricarballylate, pentaerythritol tetracaproate, dipropylene glycol dipelargonate, 1,5-pentanediol-di-(2-ethylhexanoate), etc.

The present invention also relates to the stabilizing of fatty materials including oils of animal and vegetable origin which tend to deteriorate on standing and exposure to atmospheric oxygen. Among the edible fats and oils within the scope of the present invention are: linseed oil, menhaden oil, cod liver oil, castor oil, olive oil, rapeseed oil, coconut oil, palm oil, corn oil, sesame oil, peanut oil, cotton seed oil, butter, fat, lard, beef tallow, etc. Other oils and fats which deteriorate on standing and exposure to oxygen in the air or oxygen at elevated temperatures are all within the scope of the present invention.

Within the scope of the invention also are saturated and unsaturated hydrocarbons which tend to deteriorate on storage such as, e.g., gasolines, both natural and synthetic,

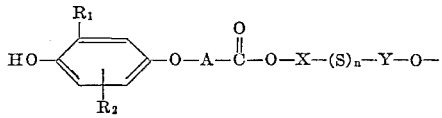

in particular, saturated and unsaturated gasolines, etc.; jet fuel; diesel oil; mineral oil; fuel oil; drying oil; waxes; resins; etc. Such hydrocarbons are protected against gum formation, discoloration and other deterioration with the stabilizers of the present invention.

It is furthermore an object of the present invention to provide novel substituted phenoxyacetic acid derivatives which are versatile and effective stabilizers in at least a single class of the foregoing organic materials which are normally subject to deterioration caused by exposure to light and/or heat and/or oxygen, etc.

A particularly preferred stabilizer of the invention is $\beta,\beta'$-thiodiethanol bis(3,5-di-tert.butyl-4-hydroxyphenoxyacetate) which is especially useful in stabilizing polyolefinic material, e.g. polypropylene and polyethylene.

It is understood that the stabilizers of the invention are not necessarily of equivalent potency. The specific stabilizer most useful to a given unstable material will depend upon several factors for its advantages. Availability and cost of raw materials for the manufacture of the stabilizer and effective inhibitory action of the stabilizer including duration and degree of activity are among the factors which control the choice of a specific stabilizer for a specific substrate which is normally subject to deterioration. Toxicity, color, stability to light and/or heat and solubility are also important factors.

In general, stabilizers of the invention are employed in a concentration of from about 0.001% to about 5% by weight, preferably from about 0.01% to about 1% by weight. The specific concentration used varies with the substrate and the stabilizer, but the following ranges are preferred.

Concentration of about 0.001% to about 1% by weight for the stabilizer in polyethylene are useful. In polypropylene from about 0.05% to about 1% by weight of stabilizer is especially useful. In mineral oils, concentrations of from about 0.005% to about 1% by weight of stabilizer are used. Gasolines are stabilized with from about 0.001% to about 0.1% by weight of stabilizer, preferably about 0.05% by weight. Fatty material of animal origin such as lard is stabilized with from about 0.001% to about 0.1% by weight of stabilizer. Oils of vegetable origin such as cotton seed oil are similarly stabilized with from about 0.001% to about 0.1% by weight of stabilizer.

Hydrocarbon material such as cycloolefins, e.g. cyclohexene, is advantageously stabilized with from about 0.001% to about 1% by weight of the stabilizers of the present invention. Similar concentrations of stabilizer are used to stabilize aldehydes such as, e.g., about 0.01% by weight in heptaldehyde. High temperature lubricants which are essentially synthetic esters of alkanoic acids, e.g. trimethylol propane tripelargonate, diisoamyladipate, etc. are stabilized with from about 0.5% to about 5%, preferably about 2%, by weight of stabilizer according to the invention.

The compounds of this invention may be used also to stabilize organic material in combination with other additive agents such as, e.g., antioxidants, pour point depressants, corrosion and rust inhibitors, dispersing agents, demulsifiers, antifoaming agents, carbon black, accelerators and other chemicals used in rubber compounding, plasticizers, color stabilizers, heat stabilizers, ultraviolet absorbers, dyes, pigments, metal chelating agents, etc.

A particularly useful stabilizer system in some cases comprises a stabilizer of the Formula I and di-lauryl-beta-thio-di-propionate (hereinafter referred to as DLTDP). Generally from about 0.005% to about 10% (based on the stabilized composition) by weight of DLTDP and other stabilizers, e.g. of the Formula I, are employed. Polypropylene is advantageously stabilized with about 0.1% to about 0.5% by weight of DLTDP and 0.1% to 0.5% by weight of a stabilizer of the Formula I.

In place of DLTDP, other similar diesters are usefully employed with the stabilizers of the Formula I for stabilization of organic material, e.g., polypropylene. Such diesters as the following are useful:

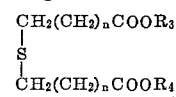

wherein $n$ is a small number, e.g. 1 or 2; and $R_3$ and $R_4$ are each independently an alkyl group, e.g. having 8 to 24 carbon atoms, such as octyl, nonyl, decyl undecyl, dodecyl, tridecyl, tetradecyl, pentadecyl, hexadecyl, heptadecyl, octadecyl, eicosyl, heneicosyl, tricosyl, tetracosyl.

The stabilizer compounds of the Formula I are prepared in a number of way. Thus, for example, the N-alkyl amides are prepared by reaction of the appropriate acid precursor compound with the appropriate N-alkylamine to form the N-alkylalkanoic acid amide.

Esters are prepared by reaction of the appropriate precursor acid and an alcohol, if desired in a non-polar solvent such as benzene, and with a catalytic quantity of p-toluenesulfonic acid. The reaction may be carried out at reflux and water removed by azeotropic distillation using a Dean-Stark trap. The solvent which remains may be removed by evaporation and the product purified in a conventional manner.

The following examples are illustrative of the invention only, and there is no intention to limit the scope of the invention thereto. In the following examples parts are by weight, unless otherwise specified, and temperature is in degrees centigrade. The relationship between parts by weight and parts by volume is as grams to cubic centimeters.

EXAMPLES

Part I.—Intermediates

EXAMPLE 1.—2-HYDROXYETHYL n-OCTYL SULFIDE AND 2-CHLOROETHYL n-OCTYL SULFIDE

These compounds are prepared in good yields from n-octyl mercaptan according to procedures similar to those described by Goldworthy et al., J. Chem. Soc., 1948, 2178 for 2-hydroxyethyl n-heptyl sulfide and 2-chloroethyl n-heptyl sulfide respectively. 2-hydroxyethyl n-octyl sulfide is a colorless liquid, B.P. 112.5–117°/1 mm., $n_D^{23.2}$ 1.4750. 2-chloroethyl n-octyl sulfide is a colorless liquid, B.P. 76–78°/0.1–0.3 mm., $n_D^{25.0}$ 1.4770.

EXAMPLE 2.—2-HYDROXYETHYL n-OCTADECYL SULFIDE 2-hydroxyethyl n-octadecyl sulfide is prepared from 85.9 parts of n-octadecyl mercaptan, 16.2 parts of sodium methylate, 150 parts of ethanol and 24.2 parts of ethylene chlorohydrin by a procedure similar to that described by Goldworthy et al., J. Chem. Soc. 1948, 2178 for 2-hydroxyethyl n-heptyl sulfide. The isolation of the product is modified as follows: the product and sodium chloride which precipitate together from the alcohol solution are filtered and taken up in 270 parts of benzene. When the product has dissolved completely, the sodium chloride is filtered off, washed with benzene, and the benzene filtrate is evaporated to dryness in vacuo. The desired product, 2-hydroxyethyl n-octadecyl sulfide (83.5 parts), is obtained as a white, crystalline powder, M.P. 55–58°.

EXAMPLE 3.—2-CHLOROETHYL n-OCTADECYL SULFIDE 2-chloroethyl n-octadecyl sulfide is prepared from the corresponding hydroxy compound in quantitative yield by a procedure similar to that described by Goldworthy et al., J. Chem. Soc., 1948, 2178 for 2-chloroethyl n-heptyl sulfide. The product, 2-chloroethyl n-octadecyl sulfide is obtained as a white crystalline solid, M.P. 40–42°.

*Analysis.*—Calculated for $C_{20}H_{41}SCl$: Cl, 10.18%. Found: Cl, 10.08%.

EXAMPLE 4.—3,5-DI-t-BUTYL-4-HYDROXYPHENOXY-ACETIC ACID 2,6-di-t-butyl-1,4-hydroquinone (22.2 parts), 12.3 parts of sodium chloroacetate, 45 parts of isopropanol and 50 parts of water are mixed, and 8.4 parts of 50% sodium hydroxide are added rapidly to this mixture with stirring under nitrogen at 24°. The reaction mixture is then refluxed for 4 hours at 80°. After the mixture has cooled to room temperature, 150 parts of water and 105 parts of ether are added, the whole shaken, and the layers separated. The ether layer is washed with 110 parts of water containing 10 parts of 10% sodium bicarbonate. The ether layer is diluted with 25 parts of ether and washed a second time with 10 parts of 5% sodium bicarbonate. The ether layer is discarded and the combined aqueous layers are neutralized with 21 parts of 6 N hydrochloric acid to pH2. The precipitated acid is filtered, washed free of chloride ion with water and dried. The crude acid (15.8 parts) is dissolved with warming in 150 parts of water and 60 parts of 10% sodium bicarbonate, the solution extracted twice with 35 parts of ether, and the clear aqueous layer acidified with 6 N hydrochloric acid to pH 1.5. The precipitated product is filtered, washed well with water until chloride free, and dried, and 15 parts of white, crystalline 3,5-di-t-butyl-4-hydroxyphenoxyacetic acid are obtained, M.P. 163–164.5°.

*Analysis.*—Calculated for $C_{16}H_{24}O_4$: neutral equivalent, 280.4. Found: neutral equivalent, 281.

EXAMPLE 5.—3-t-BUTYL-4-HYDROXYPHENOXY-ACETIC ACID 2-t-butyl-1,4-hydroquinone (49.9 parts), 42 parts of sodium chloroacetate, 40 parts of acetone, and 40 parts of water are mixed, and 27 parts of 50% sodium hydroxide are added over a period of 10 minutes to this mixture with stirring under nitrogen at room temperature. The reaction mixture is then refluxed for 4 hours at 80°. After the mixture has cooled to room temperature, it is acidified to pH 1.5 with 56 parts of 6 N hydrochloric acid and the whole taken up in 105 parts of ether and 40 parts of water, shaken, and the layers separated. The ether layer is washed three times with 50 parts of water containing 5 parts of saturated salt solution and is then extracted with 250 parts of 10% sodium bicarbonate. After separation of the layers, the ether layer is washed with 53 parts of 10% sodium bicarbonate. The aqueous bicarbonate layers are combined, washed with 70 parts of ether once and acidified with concentrated hydrochloric acid to pH 1.5–2. The crude acid, which crystallizes slowly, is filtered, washed free of chloride, and dried. The 52 parts of crude acid thus obtained are dissolved in 180 parts of hot ethyl acetate, charcoaled, filtered, and 240 parts of petroleum ether added to the filtrate warm. The solution is allowed to cool slowly, refrigerated, and the crystalline 2-t-butyl-1,4-di-phenoxyacetic acid (8.5 parts dry) filtered off. The filtrate is evaporated to dryness in vacuo and the solid residue is recrystallized from benzene. In this manner, 22.5 parts of off-white, crystalline 3-t-butyl-4-hydroxyphenoxy-acetic acid are obtained, M.P. 109–114.5°.

*Analysis.*—Calculated for $C_{12}H_{16}O_4$: C, 64.27%; H, 7.19%; Neut. Eqt., 224. Found: C, 64.14%; H, 7.57%; Neut. Eqt. 228.

Part II.—Stabilizer compounds

EXAMPLE 6.—N-(n-OCTADECYL)-3-t-BUTYL-4-HYDROXYPHENOXYACETAMIDE 3-t-butyl-4-hydroxyphenoxyacetic acid (4.56 parts) and 5.39 parts of n-octadecylamine are mixed and heated with stirring for 4½ hours at 145–155° and 4½ hours at 160–170°. At the end of the heating period, titration of the acidity of the reaction mixture indicates that the reaction is about 94% complete. The off-white solidified product (8.5 parts) is recrystallized from a petroleum ether-hexane mixture (9:1 by volume). In this way, 6.62 parts of N-(n - octadecyl)-3-t-butyl-4-hydroxyphenoxyacetamide are obtained as a white, crystalline powder, M.P. 78–80.5°.

*Analysis.*—Calculated for $C_{30}H_{53}O_3N$, percent: C, 75.74; H, 11.23; N, 2.94. Found, percent: C, 75.87; H, 10.96; N, 2.94.

EXAMPLE 7.—n-OCTADECYL 3-t-BUTYL-4-HYDROXYPHENOXYACETATE 3-t-butyl-4-hydroxyphenoxyacetic acid (6.73 parts), 8.12 parts of 1-octadecanol and 1 part of p-toluenesulfonic acid monohydrate are dissolved in 45 parts of benzene. The mixture is refluxed with stirring for 2½ hours and the water formed is collected by azeotroping with benzene into a Dean-Stark trap. At the end of the heating period approximately the theoretical amount of water has distilled over. The cooled benzene solution containing the product is filtered and the benzene filtrate concentrated to dryness in vacuo. The reddish brown solidified residue (14.5 parts) is recrystallized from petroleum ether, and 11 parts of n-octadecyl 3-t-butyl-4-hydroxyphenoxy-acetate are obtained as an off-white, crystalline powder, M.P. 61–63°.

*Analysis.*—Calculated for $C_{30}H_{52}O_4$, percent: C, 78.58; H, 11.00. Found, percent: C, 75.42; H, 11.04.

EXAMPLE 8.—N-(n-OCTADECYL)-3,5-DI-t-BUTYL-4-HYDROXYPHENOXYACETAMIDE 3,5-di-t-butyl-4-hydroxyphenoxyacetic acid (5.1 parts) and 4.9 parts of n-octadecylamine are mixed and heated with stirring for 7½ hours at 145–155°. At the end of the heating period, titration of the acidity of the reaction mixture indicates the reaction is about 90% complete. The solidified product (9.7 parts) is recrystallized from methanol and the 7 parts obtained are recrystallized a second time from petroleum ether. In this manner, 6.3 parts of N-(n-octadecyl)-3,5-di-t-butyl - 4 - hydroxyphe-noxyacetamide are obtained as a white crystalline powder, M.P. 65–68.5°.

*Analysis.*—Calculated for $C_{34}H_{61}O_3N$, percent: C, 76.78; H, 11.56; N, 2.63. Found, percent: C, 77.03; H, 11.80; N, 3.08.

In a similar manner, by using 3,5-di-t-octyl-4-hydroxyphenoxyacetic acid, then N-(n-octadecyl)-3,5-di-t-octyl-4-hydroxyphenoxyacetamide is obtained.

EXAMPLE 9.—n-OCTADECYL 3,5-DI-t-BUTYL-4-HYDROXYPHENOXYACETATE 3,5-di-t-butyl-4-hydroxyphenoxyacetic acid (5.1 parts), 4.9 parts of 1-octadecanol, and 0.5 part of p-toluenesulfonic acid monohydrate are dissolved in 40 parts of benzene. The mixture is refluxed with stirring for 2¾ hours and the water formed is collected by azeotroping with benzene into a Dean-Stark trap. At the end of the heating period, approximately the theoretical amount of water has distilled over. The cooled benzene solution containing the product is filtered and the benzene stripped from the filtrate in vacuo. The residue (9 parts) which crystallizes slowly is recrystallized from methanol twice, and 5 parts of n-octadecyl 3,5-di-t-butyl-4-hydroxyphenoxyacetate are obtained as a white, crystalline powder, M.P. 43–45°.

*Analysis.*—Calculated for $C_{34}H_{60}O_4$, percent: C, 76.64; H, 11.35. Found, percent: C, 77.11; H, 11.55.

EXAMPLE 10.—β-(n-OCTYLMERCAPTO)ETHYL 3-t-BUTYL-4-HYDROXYPHENOXYACETATE 3-t-butyl-4-hydroxyphenoxyacetic acid (5.6 parts) is dissolved in 40 parts of methanol under nitrogen and 1.4 parts of potassium hydroxide dissolved in 20 parts of methanol are added with stirring. To this solution are added 5.2 parts of 2-chloroethyl n-octyl sulfide all at once and the stirred mixture is warmed at 40–50° for 6½ hours under nitrogen. At the end of the heating period, titration of the basicity of the reaction mixture with perchloric acid in glacial acetic acid solvent indicates that the reaction is about 94% complete. The cooled mixture from which some sodium chloride has precipitated is treated with 50 parts of ether and 75 parts of water, the whole shaken and the layers separated. The ether layer is washed first with 25 parts of water, then with 25 parts of 10% sodium bicarbonate and finally with 25 parts of water and is dried over anhydrous magnesium sulfate. After filtration from the dehydrating agent the ether is removed by distillation in vacuo. The brown oily residue (7.5 parts) is distilled and 4.4 parts of β-(n-octylmercapto)ethyl 3-t-butyl-4-hydroxyphenoxyacetate are obtained as a pale yellow viscous oil, B.P. 220–224°/ 0.35 mm.

Analysis.—Calculated for $C_{22}H_{36}O_4S$, percent: C, 66.63; H, 9.15; S, 8.08. Found, percent: C, 66.46; H, 9.38; S, 8.06.

EXAMPLE 11.—β-(n-OCTYLMERCAPTO)ETHYL 3,5-DI-t-BUTYL-4-HYDROXYPHENOXYACETATE 3,5-di-t-butyl-4-hydhoxyphenoxyacetic acid (5.6 parts), 40 parts of methanol, 1.1 parts of potassium hydroxide in 20 parts of methanol and 4.2 parts of 2-chloroethyl n-octyl sulfide are mixed as described in the above example for β-(n-octylmercapto)ethyl 3-t-butyl - 4 - hydroxyphenoxyacetate. The reaction mixture is warmed with stirring at 40–45° under nitrogen for 3 hours. At the end of the heating period titration of the basicity of the reaction mixture with perchloric acid in glacial acetic acid solvent indicates that the reaction is about 93% complete. The cooled mixture is shaken with ether and water and the ether solution washed and dried as described in the above example. After removal of the ether in vacuo, the desired product (7 parts) is obtained crude as a yellow oil.

EXAMPLE 12.—β-(n-OCTADECYLMERCAPTO)ETHYL 3,5-DI-t-BUTYL-4-HYDROXYPHENOXYACETATE 3,5-di-t-butyl-4-hydroxyphenoxyacetic acid (4.20 parts), 4.95 parts of 2-hydroxyethyl n-octadecyl sulfide and 0.5 part of p-toluenesulfonic acid monohydrate are dissolved in 40 parts of benzene. The mixture is refluxed with stirring for 2½ hours and the water formed is collected by azeotroping with benzene into a Dean-Stark trap. At the end of the heating period about 75% of the theoretical amount of water has distilled over. The cooled benzene solution containing the product is filtered and the benzene removed from the filtrate in vacuo. The colorless syrupy residue (10.5 parts) is taken up in 15 parts of petroleum ether and the solution filtered from some insoluble material. The filtrate is washed in turn with 20 parts of 2.5% sodium bicarbonate and twice with 10 parts of water. The petroleum ether layer, after standing overnight with the second water wash to allow separation, is separated from a badly emulsified water layer. The organic layer is dried over anhydrous magnesium sulfate, filtered from the dehydrating agent and the petroleum ether removed in vacuo. The residue (5.5 parts), after it crystallizes completely, is titrated with methanol, filtered, washed with methanol and dried. In this manner 4.3 parts of white crystalline β-(n-octadecylmercapto)ethyl 3,5-di-t-butyl-4-hydroxyphenoxyacetate are obtained, M.P. 43–44.5°.

Analysis.—Calculated for $C_{36}H_{64}O_4S$, percent: C, 72.92; H, 10.88; S, 5.41. Found, percent: C, 73.16; H, 11.12; S, 5.80.

EXAMPLE 13.—β,β'-THIODIETHANOL BIS(3,5-DI-t-BUTYL-4-HYDROXYPHENOXYACETATE 3,5-di-t-butyl - 4 - hydroxyphenoxyacetic acid (8.40 parts), 1.83 parts of β,β'-thiodiethanol and 0.5 parts of p-toluenesulfonic acid monohydrate are dissolved in 45 parts of benzene. The mixture is refluxed with stirring for 2¼ hours and the water formed is collected by azeotroping with benzene into a Dean-Stark trap. At the end of the heating period, approximately the theoretical amount of water has distilled over. The benzene solution containing the product is cooled to room temperature and washed in turn with 20 parts of 2.5% sodium bicarbonate solution twice, once with 10 parts of water, once again with 20 parts of 2.5% sodium bicarbonate solution and finally, once again with 10 parts of water. The benzene solution is dried over anhydrous magnesium sulfate, and, after filtration from the dehydrating agent, the benzene is removed by distillation in vacuo. The residue (9 parts) which crystallizes slowly, is triturated and washed twice with cold methanol and the 5 parts of off-white crystalline compound obtained are recrystallized from a mixture of hexane and ethyl acetate (12:1 by volume.) In this manner, 4.5 parts of white, crystalline β,β'-thiodiethanol bis - (3,5-di-t-butyl-4-hydroxyphenoxyacetate) are obtained, M.P. 93–99°.

Analysis.—Calculated for $C_{36}H_{54}O_8S$, percent: C, 66.84; H, 8.41; S, 4.96. Found, percent: C, 66.57; H, 8.77; S, 5.34.

EXAMPLE 14.—1,4-BUTANEDIOL BIS(3,5-DI-t-BUTYL-4-HYDROXYPHENOXYACETATE 3,5 - di - t - butyl-4-hydroxyphenoxyacetic acid (8.40 parts), 1.35 parts of 1,4-butanediol, and 0.5 part of p-toluenesulfonic acid monohydrate are dissolved in 45 parts of benzene. The mixture is refluxed with stirring for 1¾ hours, and the water formed is collected by azeotroping with benzene into a Dean-Stark trap. At the end of the heating period, approximately the theoretical amount of water has distilled over. The benzene solution containing the product is cooled to room temperature and washed in turn with 20 parts of 2.5% sodium bicarbonate solution twice, and once with 10 parts of water. The benzene solution is dried over anhydrous magnesium sulfate, and after removal of the dehydrating agent by filtration, the benzene is distilled off in vacuo. The pale yellow crystalline residue (8.1 parts) is recrystallized from a mixture of hexane and ethyl acetate (7:2 by volume). In this way, 5.5 parts of white, crystalline 1,4-butanediol bis - (3,5-di-t-butyl-4-hydroxyphenoxyacetate) are obtained, M.P. 125–128.5°.

Analysis.—Calculated for $C_{36}H_{54}O_8$, percent: C, 70.33; H, 8.85. Found, percent: C, 70.59; H, 8.92.

Part III.—Stabilization of unstable material

EXAMPLE 15.—STABILIZATION OF POLYPROPYLENE

Unstabilized polypropylene powder (Hercules Profax 6501) is thoroughly blended with 0.5% by weight of β,β'-thiodiethanol bis-(3,5-di-t-butyl - 4 - hydroxyphenoxyacetate). The blended material is then milled on a two roller mill at 182° for 5 minutes, after which time the stabilized polypropylene is sheeted from the mill and allowed to cool.

The milled polypropylene sheet is then cut into small pieces and pressed for 7 minutes on a hydraulic press at 218° and 2000 pounds per square inch pressure. The resultant sheet of 25 thickness is then tested for resistance to accelerated aging in a forced draft over at 149°. The resultant composition of 0.5% by weight of β,β'-thiodiethanol bis-(3,5-di-t-butyl-4-hydroxyphenoxyacetate) and polypropylene is stabilized against oxidative deterioration for more than 500 hours. The unstabilized polypropylene deteriorates after only 3 hours.

In like manner as in this example, stabilized compositions of polypropylene are prepared having 0.5% by weight of each of the following:

N-(n-octadecyl)-3-t-butyl-4-hydroxyphenoxyacetamide
n-Octadecyl 3-t-butyl-4-hydroxyphenoxyacetate
N-(n-octadecyl)-3,5-di-t-butyl-4-hydroxyphenoxyacetamide
n-Octadecyl 3,5-di-t-butyl-4-hydroxyphenoxyacetate
β-(n-Octadecylmercapto)ethyl 3,5-di-t-butyl-4-hydroxyphenoxyacetate
β-(n-Octylmercapto)ethyl 3-t-butyl-4-hydroxyphenoxyacetate
β-(n-Octylmercapto)ethyl 3,5-di-t-butyl-4-hydroxyphenoxyacetate
1,4-butanediol bis-(3,5-di-t-butyl-4-hydroxyphenoxyacetate In a similar manner as in this example, stable compositions of polypropylene are prepared with 0.1% by weight of a compound according to each of the preceding examples in Part II, together with 0.5% by weight of dilauryl-β-thiodipropionate. In some cases the improvement is so remarkable that a synergistic effect is observed in the oven-aging test.

EXAMPLE 16.—STABILIZATION OF MINERAL OIL

A water-white, refined (U.S.P. grade) mineral oil (Esso Primol D) is stabilized under the following test conditions.

A sample of mineral oil (10 parts) is placed in a Sligh-type oxidation flask filled with oxygen at room temperature (25°) and atmospheric pressure. Thereafter, the flask is sealed to form a system having a mercury manometer which measures the pressure changes as oxygen is absorbed by the sample in the flask. The sample is then heated at 150° until the manometer registers a decrease of 300 mm. Hg pressure within the flask with reference to the maximum pressure obtained at 150°. The stabilized mineral oil contains 0.1% by weight of N-(n-octadecyl)-3,5-di - t - butyl - 4 - hydroxyphenoxyacetamide.

EXAMPLE 17.—STABILIZATION OF A RESIN CONTAINING ELASTOMER

High impact polystyrene resin containing elastomer (i.e. butadiene-styrene) is stabilized against loss of elongation properties by incorporation of 0.5% by weight of N-(n-octadecyl)-3,5-di-t-butyl-4-hydroxyphenoxyacetamide. Under the test conditions described hereinbelow, the stabilized resin retains a higher percentage of its original elongation properties, whereas the unstabilized resin retains less elongation properties.

The unstabilized resin is dissolved in chloroform and the stabilizer then added, after which the mixture is cast on a glass plate and the solvent evaporated to yield a uniform film which, upon drying, is removed and cut up, and then pressed for 7 minutes at a temperature of 163° and a pressure of 2000 pounds per square inch into a sheet of uniform thickness (25 mil). The sheets are then cut into strips, approximately 4 x 0.5 inches. A portion of these strips is then measured for length of elongation in the Instron Tensile tester (Instron Engineering Corporation, Quincy, Mass.). The remaining portion of the strips is aged in a forced draft oven for 6 weeks at 75° and thereafter tested for elongation.

A similar amount of N-(n-octadecyl)-3-t-butyl-4-hydroxyphenoxyacetamide also is effective in stabilizing high impact polystyrene.

Similar results are obtained with a terpolymer of acrylonitrile-butadiene-styrene.

What is claimed is:
1. A composition of matter stabilized against deterioration which comprises polyolefin normally subject to deterioration and a stabilizing amount of a stabilizer compound of the formula.

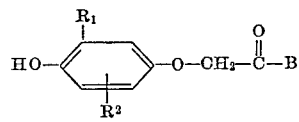

wherein $R_1$ is alkyl having 3 to 8 carbon atoms,
$R_2$ is a member selected from the group consisting of hydrogen and alkyl having 1 to 8 carbon atoms, and
B is a member selected from the group consisting of alkylimino having 1 to 24 carbon atoms, alkoxy having 1 to 24 carbon atoms, alkylthioalkoxy having 2 to 24 carbon atoms, and the radical of the formula

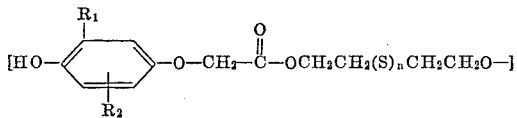

wherein $R_1$ and $R_2$ are the same as above, and
$n$ is a member selected from the group consisting of 0 to 1.

2. A composition of matter as claimed in claim 1 wherein the polyolefin is polypropylene.
3. A composition of matter which comprises polyolefin and a stabilizer system consisting essentially of a mixture of:

(a) a compound of the formula

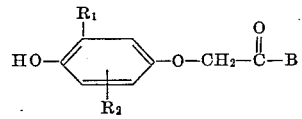

wherein $R_1$ is alkyl having 3 to 8 carbon atoms,
$R_2$ is a member selected from the group consisting of hydrogen and alkyl having 1 to 8 carbon atoms, and
B is a member selected from the group consisting of alkylimino having 1 to 24 carbon atoms, alkoxy having 1 to 24 carbon atoms, alkylthioalkoxy having 2 to 24 carbon atoms, and the radical of the formula

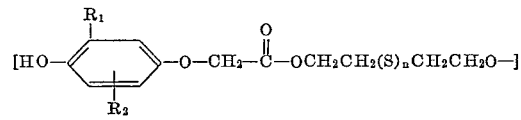

wherein $R_1$ and $R_2$ are the same as above, and
$n$ is a member selected from the group consisting of 0 and 1;

(b) a compound of the formula
wherein $n$ is a member selected from the group consisting of 1 and 2, and
$R_3$ and $R_4$ are each independently an alkyl group having 8 to 24 carbon atoms.

4. A composition of matter as claimed in claim 3 wherein said polyolefin is polypropylene.
5. A composition of matter which comprises polypropylene and N - (n - octadecyl) - 3 - t-butyl-4-hydroxyphenoxyacetamide.
6. A composition of matter which comprises polypropylene and n-octadecyl 3-t-butyl-4-hydroxyphenoxyacetate.
7. A composition of matter which comprises polypropylene and N-(n-octadecyl)-3,5-di-t-butyl-4-hydroxyphenoxyacetamide.
8. A composition of matter which comprises polypropylene and n-octadecyl 3,5 - di - t - butyl - 4-hydroxyphenoxyacetate.
9. A composition of matter which comprises polypropylene and β-(n-octylmercapto)ethyl 3-t-butyl-4-hydroxyphenoxyacetate.
10. A composition of matter which comprises polypropylene and β-(n-octylmercapto)ethyl 3,5-di-t-butyl-4-hydroxyphenoxyacetate.
11. A composition of matter which comprises polypropylene and β - (n - octadecylmercapto)ethyl 3,5 - di-t-butyl-4-hydroxyphenoxyacetate.

12. A composition of matter which comprises polypropylene and β,β'-thiodiethanol bis(3,5-di-t-butyl-4-hydroxyphenoxyacetate).

13. A composition of matter which comprises polypropylene and 1,4 - butanediol bis(3,5 - di - t - butyl-4-hydroxyphenoxyacetate).

14. A composition of matter which comprises polypropylene, di - lauryl - beta - thiodipropionate and N - (n-octadecyl)-3,5-di-t-butyl-4-hydroxyphenoxyacetamide.

15. A composition of matter which comprises a mixture consisting essentially of:

(a) a compound of the formula

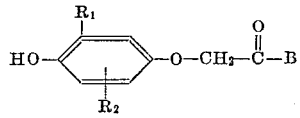

wherein $R_1$ is alkyl having 3 to 8 carbon atoms, $R_2$ is a member selected from the group consisting of hydrogen and alkyl having 1 to 8 carbon atoms, and B is a member selected from the group consisting of alkylimino having 1 to 24 carbon atoms, alkoxy having 1 to 24 carbon atoms, alkylthioalkoxy having 2 to 24 carbon atoms, and the radical of the formula

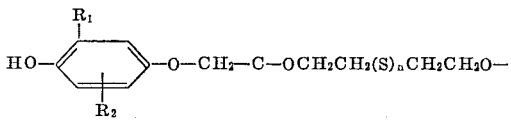

wherein $R_1$ and $R_2$ are the same as above, and $n$ is a member selected from the group consisting of 0 and 1, (b) A compound of the formula

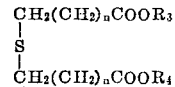

wherein $n$ is a member selected from the group consisting of 1 and 2, and $R_3$ and $R_4$ are each independently an alkyl group having 8 to 24 carbon atoms.

No references cited.

DONALD E. CZAJA, *Primary Examiner.*

V. P. HOKE, *Assistant Examiner.*

UNITED STATES PATENT OFFICE
CERTIFICATE OF CORRECTION

Patent No. 3,380,962    April 30, 1968

Janet B. Peterson et al.

It is hereby certified that error appears in the above numbered patent requiring correction and that the said Letters Patent should read as corrected below.

Column 6, line 21, "78.58" should read -- 75.58 --.
Column 10, after line 46, insert the formula

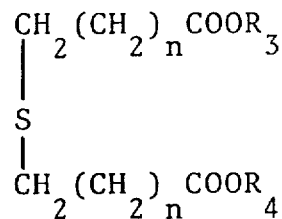

Signed and sealed this 4th day of November 1969.

(SEAL)
Attest:

EDWARD M. FLETCHER, JR.    WILLIAM E. SCHUYLER, JR.
Attesting Officer          Commissioner of Patents